May 29, 1951 — L. GOTHBERG — 2,555,124

SLACK ADJUSTER

Filed March 29, 1949

INVENTOR.
Lawrence Gothberg
BY
Orin O. B. Garner
Atty.

Patented May 29, 1951

2,555,124

UNITED STATES PATENT OFFICE 2,555,124

SLACK ADJUSTER

Lawrence Gothberg, Chicago, Ill., assignor to American Steel Foundries, Chicago, Ill., a corporation of New Jersey Application March 29, 1949, Serial No. 84,125

5 Claims. (Cl. 287—59)

This invention relates to slack adjusters and more particularly to a novel railway slack adjuster adapted to compensate for wear in brake rigging commonly associated with railway passenger car trucks.

A general object of the invention is to devise a simple, compact, and economical slack adjuster of the screw type wherein the adjustment is made by means of a threaded member.

A more specific object of the invention is to devise an arrangement in which the threads of the device are at all times enclosed during operation thereof to prevent abrasive dust and dirt from fouling the threads.

A further object of the invention is to simplify the construction of a screw type slack adjuster by providing a threaded sleeve rotatable within a housing and having wrench-engaging means projecting through an opening of the housing, the opposite end of the housing being closed by a readily removable retainer.

Still another object of the invention is to devise a novel retainer which may be readily assembled and disassembled and is adapted to function as stop means limiting outward movement of the adjusting screw from the sleeve.

The foregoing and other objects and advantages of the invention will become apparent from a consideration of the following specification and the accompanying drawings, wherein.

Figure 1:
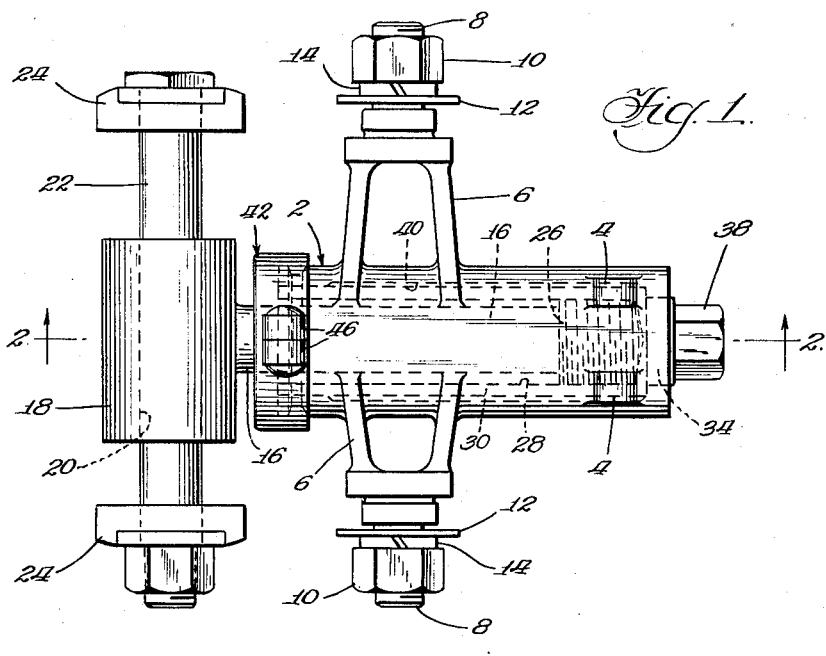
Figure 1 is a top plan view of a conventional railway slack adjuster embodying the invention.

Describing the invention in detail and referring first to Figure 1, the novel slack adjuster comprises a cast iron or steel housing, generally designated 2, having spaced lugs 4 at one end thereof adapted for pivotal mounting of associated lock means (not shown) for the adjuster mechanism, hereinafter described.

The housing 2 is provided at opposite sides thereof with arms 6 having threaded extremities 8. Nuts 10 are threaded on the extremities 8 which are provided with washers 12 and lock washers 14, the nuts 10 being adapted to connect the arms 6 to associated straps (not shown) of conventional railway brake rigging.

A screw 16, preferably formed of steel, projects into the housing and is provided at its outer extremity with a bearing portion 18 having an opening 20 receiving a bolt and nut assembly 22 having spaced washers 24, said assembly comprising conventional connecting means for an associated brake lever (not shown).

Figure 2:
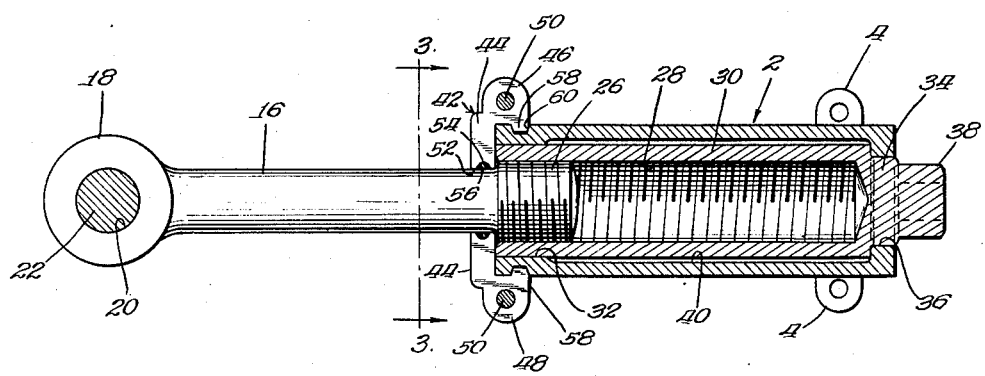
Figure 2 is a sectional view on the line 2—2 of Figure 1 with the slack adjuster expanded.
Figure 3:
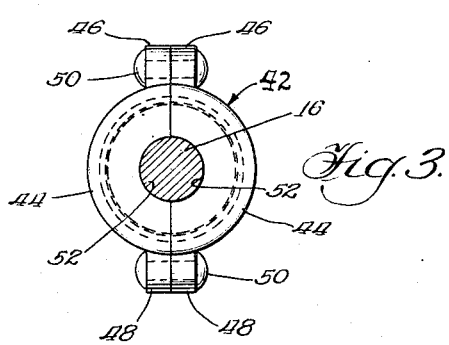
Figure 3 is a fragmentary sectional view on the line 3—3 of Figure 2 illustrating the manner in which the retainer unit is coupled with the slack adjuster housing.

Referring to Figures 2 and 3, the screw 16 is provided with a relatively large diameter, threaded portion 26 in complementary threaded engagement with threads 28 of a sleeve 30 having slidable rotatable bearing at 32 within the open end of the housing 2. The sleeve comprises a trunnion 34 of reduced diameter having slidable rotatable bearing within a complementary opening 36 of the other end of the housing 2, and the trunnion 34 is provided with a polygonal wrench-engaging portion 38 disposed externally of the housing and adapted for actuation by conventional operating means (not shown), such as a wrench or other suitable tool.

The inner surface of the housing 2 is relieved as at 40 inwardly of the bearing 32 to afford a cavity adapted to contain any dirt or dust which might possibly enter the housing thereby preventing such dust from entering the threads 28 of the sleeve 30.

The open end of the housing is provided with a retainer, generally designated 42, in the form of a split ring comprising a pair of substantially identical semi-annular segments 44. As best seen in Figure 3, the segments are provided with top and bottom lugs 46 and 48 respectively, secured together by removable means, such as rivets 50, and the segments 44 comprise semi-annular recesses 52 adapted in the assembled position of the segments to define an annular opening complementary to the intermediate portion of the screw 16 between the enlarged threaded portion 26 thereof and the bearing portion 18 thereof. Preferably each segment 44 is provided within its recess 52 with an arcuate groove 54 adapted to accommodate sealing means, such as a resilient ring 56, adapted to accommodate slidable movement of the screw 16 while affording a positive seal therewith preventing entrance of any dirt or dust into the sleeve 30.

Each of the segments 44 is provided on its inner perimeter with a tongue 58 tapering radially inwardly toward the longitudinal center line or axis of the body or housing 2 and fitted within a complementary groove or recess 60 therein, thereby affording a tight fit between the retainer 42 and the body 2 when the segments 44 are in assembled position drawn up tight by the rivets 50, as shown in Figure 3. This arrangement prevents vibrations and chatter between the retainer and body under the intense vibrations of railway service.

It may be noted that the central opening through the retainer 42 defined by the mating recesses 52 of the segments 44 accommodates movement of the screw 16 from the innermost position shown in Figure 1 to the outermost position shown in Figure 2. However, the retainer is engageable with the large diameter threaded portion 26 of the screw to limit outward movement thereof at the position shown in Figure 2 thereby preventing any possibility of accidental disassembly of the device.

An important feature of the invention resides in the provision of a wrench-engaging portion 38 formed integrally with the trunnion 34 of the sleeve 30 which is preferably of non-ferrous metal, such as brass, and it will be understood that by means of this arrangement the necessity of providing a separate wrench-engaging collar shrunk fit on the sleeve extension, as is conventional in the prior art, may be avoided.

I claim:

1. A slack adjuster comprising a body having an open end and another end with a central cylindrical opening, a sleeve rotatable within the body and having slidable bearing with an internal surface thereof at the open end thereof, said sleeve having a relatively small diameter trunnion in slidable bearing engagement with the body in said opening, a dust collecting cavity between said surface and said other end of the body, a wrench-engaging portion on said trunnion disposed externally of the body, a retainer removably connected to the open end of the body and having a central cylindrical opening, a screw having a relatively large diameter threaded portion in complementary threaded engagement with the sleeve, said screw having another portion adapted for connection to an associated member to be adjusted and having a relatively small diameter intermediate portion slidably fitted in the last-mentioned opening.

2. A slack adjuster comprising a housing having an open end and another end with an opening therethrough, said housing having means intermediate said ends for connection to an associated member, a sleeve having an open end slidably fitted in the open end of said housing and having a closed end engageable with said other end of the housing, said closed end having a relatively small diameter portion rotatably fitted within said opening, said portion having wrench-engaging means externally of the body, means removably connected to the body for retaining said sleeve therein, threads in the sleeve, and a screw having threads engageable with those of the sleeve and having means for connection to another member whereby upon rotation of said wrench-engaging means the relative position of said members may be adjusted.

3. A slack adjuster, according to claim 2, wherein the body is provided with an internal dust collecting receptacle surrounding the sleeve between the small diameter portion thereof and the open end thereof.

4. A slack adjuster comprising a body, a sleeve having an open end slidably mounted within the body for rotation therein and having a closed end with a portion slidably fitted within a complementary opening of the body for rotation in said opening, said portion having integral wrench-engaging means disposed externally of the body, and a screw having a threaded portion at one end thereof received within the open end of the sleeve in complementary threaded engagement therewith, said screw and body having connecting means for associated elements to be adjusted relative to each other, said screw having an unthreaded portion and said body having a readily removable retaining means engageable with the threaded portion to limit movement thereof outwardly with respect to the open end of the sleeve.

5. A slack adjuster, according to claim 4, wherein the retaining means comprises a pair of semi-annular members in tongue and groove engagement with the body, said members defining an opening complementary to and snugly engaging the unthreaded portion of the screw.

LAWRENCE GOTHBERG.

REFERENCES CITED

The following references are of record in the file of this patent:

UNITED STATES PATENTS

| Number | Name | Date |
|---|---|---|
| 1,397,373 | Gemmer | Nov. 15, 1921 |
| 1,418,298 | Gorman | June 6, 1922 |
| 2,403,512 | Flesch | July 9, 1946 |